United States Patent
Yitzhak et al.

(10) Patent No.: US 12,399,574 B2
(45) Date of Patent: *Aug. 26, 2025

(54) STABILIZING GESTURES IN ARTIFICIAL REALITY ENVIRONMENTS

(71) Applicant: Meta Platforms Technologies, LLC, Menlo Park, CA (US)

(72) Inventors: Eldad Yitzhak, Foster City, CA (US); Asaf Nitzan, Menlo Park, CA (US); Matthew Longest, Seattle, WA (US); Brandon Furtwangler, Issaquah, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/675,326

(22) Filed: May 28, 2024

(65) Prior Publication Data
US 2024/0385694 A1 Nov. 21, 2024

Related U.S. Application Data

(63) Continuation of application No. 18/194,323, filed on Mar. 31, 2023, now abandoned, which is a
(Continued)

(51) Int. Cl.
*G06F 3/01* (2006.01)
*G02B 27/00* (2006.01)
(Continued)

(52) U.S. Cl.
CPC ......... *G06F 3/017* (2013.01); *G02B 27/0093* (2013.01); *G02B 27/017* (2013.01); *G06T 19/006* (2013.01)

(58) Field of Classification Search
CPC ... G06F 3/017; G02B 27/0093; G02B 27/017; G06T 19/006
See application file for complete search history.

(56) References Cited

U.S. PATENT DOCUMENTS 9,874,977 B1 * 1/2018 Soyannwo ............. G06F 3/042
11,116,395 B1 * 9/2021 Gur ........................ A61B 3/113
(Continued)

OTHER PUBLICATIONS

International Search Report and Written Opinion for International Application No. PCT/US2021/065183 mailed Mar. 24, 2022, 11 pages.
(Continued)

*Primary Examiner* — Dmitriy Bolotin
(74) *Attorney, Agent, or Firm* — Morgan, Lewis & Bockius LLP

(57) ABSTRACT

In one embodiment, a computing may display an artificial reality environment to a user wearing an artificial reality device. The artificial reality environment may include at least a first virtual object. The computing system may monitor a motion of a first gesture performed by the user when interacting with the first virtual object. The computing system may determine, using a motion-stabilization profile of the user, a motional range associated with the user. The computing system may compare the motion of the first gesture performed by the user with the motional range associated with the user. The computing system may stabilize one or more second gestures performed by the user during subsequent user interactions in the artificial reality environment responsive to determining that the motion of the first gesture performed by the user exceeds the motional range.

20 Claims, 6 Drawing Sheets

Related U.S. Application Data continuation of application No. 17/138,256, filed on Dec. 30, 2020, now Pat. No. 11,687,165.

(51) Int. Cl.
*G02B 27/01* (2006.01)
*G06T 19/00* (2011.01)

(56) References Cited

U.S. PATENT DOCUMENTS

| | | | |
|---|---|---|---|
| 11,687,165 B2* | 6/2023 | Yitzhak | G06T 19/006 |
| | | | 345/156 |
| 2008/0306535 A1* | 12/2008 | Winslow | A61B 17/7043 |
| | | | 606/264 |
| 2016/0038088 A1* | 2/2016 | Lari | A61B 5/11 |
| | | | 600/595 |
| 2017/0228025 A1* | 8/2017 | Hall | G06F 3/017 |
| 2017/0278306 A1* | 9/2017 | Rico | G02B 27/0093 |
| 2019/0362557 A1 | 11/2019 | Lacey et al. | |
| 2021/0307652 A1* | 10/2021 | Lari | G09B 19/0038 |
| 2022/0141483 A1* | 5/2022 | Takamura | H04N 19/172 |
| | | | 375/240.12 |
| 2022/0206586 A1* | 6/2022 | Yitzhak | G02B 27/0093 |
| 2023/0004229 A1* | 1/2023 | Karri | G06F 16/583 |
| 2023/0045759 A1* | 2/2023 | Ma | H04N 7/141 |
| 2023/0061174 A1* | 3/2023 | Hong | G02B 26/0841 |

OTHER PUBLICATIONS

Pfeiffer, et al., "Gaze+ Pinch Interaction in Virtual Reality," Proceedings of the 5th Symposium on Spatial User Interaction, SUI '17, Oct. 16, 2017, pp. 99-108.

\* cited by examiner

STABILIZING GESTURES IN ARTIFICIAL REALITY ENVIRONMENTS

PRIORITY

This application is a continuation under 35 U.S.C. § 120 of U.S. patent application Ser. No. 18/194,323, filed Mar. 31, 2023, which is a continuation of U.S. patent application Ser. No. 17/138,256, filed Dec. 30, 2020, now U.S. Pat. No. 11,687,165, issued on Jun. 27, 2023, which is incorporated herein by reference.

TECHNICAL FIELD

This disclosure generally relates to artificial reality environments, and, more specifically, to stabilizing gestures in artificial reality environments.

BACKGROUND

A virtual reality environment may generally include a computer-generated environment that includes virtual reality artifacts such as virtual locations, virtual events, and the like. Such a virtual world and its artifacts typically include various virtual applications (e.g., virtual video games), which may allow users to utilize these artifacts by manipulating their virtual presence in the form of their computer-generated representation commonly known as avatars. Certain virtual reality applications (e.g., virtual reality video games, virtual reality tours, virtual reality interfaces) may allow different users to meet up to socialize, to collaborate on one or more tasks within the virtual reality applications, or to compete against one another within the virtual environments.

Controllers may generally be used by the user to interact within the virtual environment. Though, in some instances, allowing users to utilize one or more body members (e.g., hands) to interact within virtual environments may enhance the user's virtual reality experience, particularly with respect to, for example, first-person point of view (POV) virtual video games. However, due to a lack of any positioning data being received by the virtual reality device from the body member of the user, certain movements or hand gestures may be difficult to track and determine by the virtual reality device. For example, if the user were to gesture in mid-air to manually interact with a virtual user interface, the user's hand tremors or jitters would prevent the user from providing a command or selection within the virtual reality environment. It may be useful to provide techniques to improve tracking and determining body members in virtual reality environments.

SUMMARY OF CERTAIN EMBODIMENTS

The present embodiments include techniques for learning user-specific motional patterns and stabilizing hand gestures in artificial reality environments, in accordance with the presently disclosed embodiments. In certain embodiments, a computing platform may display an artificial reality environment to a user. In certain embodiments, the computing platform may determine a context in which the user is interacting with the artificial reality environment. For example, in certain embodiments, the computing platform may determine the context in which the user is interacting with the artificial reality environment by determining a trigger for which to commence monitoring the motional patterns of the hand gesture performed by the user with respect to the target virtual object. Indeed, in some embodiments, the determined context may be utilized as a trigger to commence monitoring the motional patterns of the hand gesture performed by the user with respect to the target virtual object and as a means to identify a particular ground truth with respect to the target virtual object by which to evaluate the motional patterns of the hand gesture performed by the user with respect to the target virtual object. In certain embodiments, the computing platform may determine, based on the context, that the user intends to use a hand gesture to interact with a target virtual object within the artificial reality environment. For example, in certain embodiments, the computing platform may determine, based on the context, that the user intends to use the hand gesture to interact with the target virtual object by determining, for example, a time elapsed while the user is attempting to interact with the target virtual object, one or more particular hand movements or wrist movements the user may make with respect to the target virtual object, one or more particular hand poses the user may hold for some time period, one or more particular hand gestures (e.g., handwaving, finger pointing, fist-clutching, signing), one or more sequences of hand poses, and so forth.

In certain embodiments, the computing platform may then monitor, while the user is attempting to interact with the target virtual object, motional patterns of the hand gesture performed by the user with respect to the target virtual object. In certain embodiments, the computing platform may then generate a motion-stabilization profile associated with the user based on the motional patterns, in which the motion-stabilization profile may be utilized to stabilize the hand gesture performed by the user during subsequent user interactions with virtual objects in the artificial reality environment. For example, in some embodiments, the computing platform may utilize a machine learning (ML) model that may receive the motional patterns of hand gestures performed by the user with respect to various target virtual objects while the user is attempting to interact with the various target virtual objects and may then utilize the motional patterns to generate the motion-stabilization profile for that particular user. In one embodiment, the motion-stabilization profile may be associated with only the particular user, such that the computing platform may generate N different motion-stabilization profiles for each of N different users.

In certain embodiments, the computing platform may determine a motional range (e.g., distance range, voxel range, pixel range, pose range, and so forth) associated with the user based on the motion-stabilization profile. For example, in certain embodiments, the computing platform may monitor, while the user is attempting to perform subsequent user interactions with virtual objects in the artificial reality environment, a motion of the hand gesture performed by the user with respect to the virtual objects. In certain embodiments, the computing platform may then determine to stabilize the hand gesture performed by the user during the subsequent user interactions with virtual objects in the artificial reality environment when the motion of the hand gesture performed by the user exceeds the motional range (e.g., distance range, voxel range, pixel range, pose range, and so forth). In another embodiment, the computing platform may monitor, while the user is attempting to perform subsequent user interactions with virtual objects in the artificial reality environment, a motion of the hand gesture performed by the user with respect to the virtual objects. In some embodiments, the computing platform may then determine to forgo stabilizing the hand gesture performed by the user during the subsequent user interactions with virtual objects in the artificial reality environment when the motion of the hand gesture performed by the user is within the motional range (e.g., distance range, voxel range, pixel range, pose range, and so forth).

Accordingly, the present techniques are provided for learning user-specific motional patterns and stabilizing hand gestures in artificial reality environments. Specifically, the present techniques of learning user-specific motional patterns and stabilizing the user's motional patterns within artificial reality environments may allow, for example, for user body members (e.g., hands, head, limbs, fingers, and so forth) to serve as the sole input modality for the artificial reality devices. For example, in certain embodiments, when the particular user is interacting within artificial reality environments, a hand gesture stabilization process (e.g., executed in the background) may be instantiated on the artificial reality device to learn the particular user's motional patterns, to generate a motion-stabilization profile for the particular user, and then stabilize the hand gesture of the user while the user is interacting with the artificial reality application executing on the artificial reality device. Indeed, the hand gesture stabilization techniques may be implemented utilizing machine learning (ML) models to learn user motional patterns and utilize the learned motional patterns to generate a motion-stabilization profile (e.g., the signature hand tremors, hand jitters, and more generally any learned or observed hand motional pattern or hand movement pattern that may be specific to the particular user). After the user-specific motion-stabilization profile is generated, and a pixel region of interest or range is generated by which the motion-stabilization profile is defined, the computing platform may automatically stabilize the hand gesture performed by the user during the subsequent user interactions with virtual objects in the artificial reality environment when the motion of the hand gesture performed by the user is not within the motional range (e.g., distance range, voxel range, pixel range, pose range, and so forth). In this way, the present techniques may allow for the user body members, and specifically user's hands, to completely replace all controllers or other physical objects for interacting in artificial reality environments, and may thus enhance the user's experiences in artificial reality environments.

The embodiments disclosed herein are only examples, and the scope of this disclosure is not limited to them. Certain embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
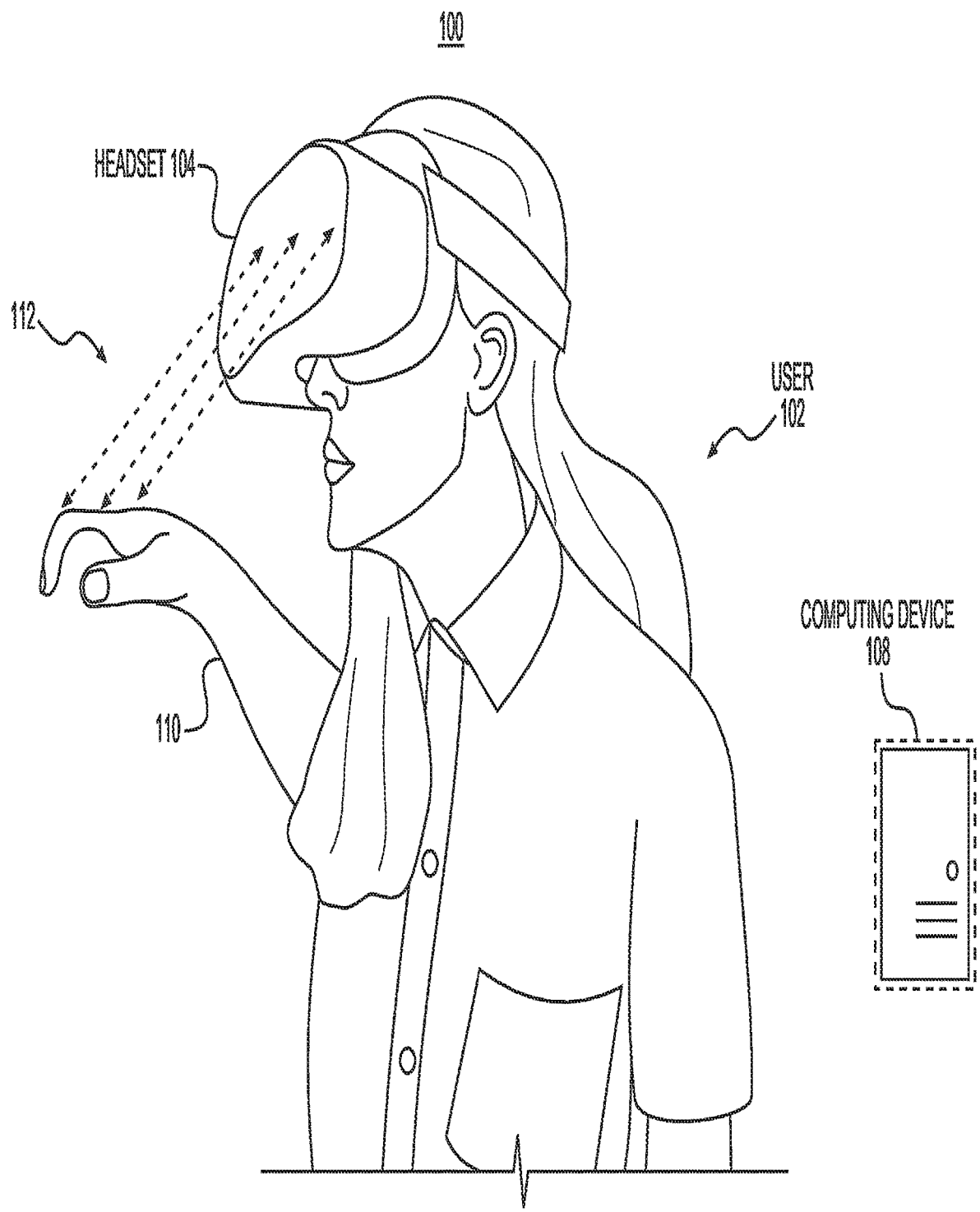
FIG. 1 illustrates an example embodiment of an artificial reality system.

A virtual reality environment may generally include a computer-generated environment that includes virtual reality artifacts such as virtual locations, virtual events, and the like. Such a virtual world and its artifacts typically include various virtual applications (e.g., virtual video games), which, may allow users to utilize these artifacts by manipulating their virtual presence in the form of their computer-generated representation commonly known as avatars. Certain virtual reality applications (e.g., virtual reality video games, virtual reality tours, virtual reality interfaces) may allow different users to meet up to socialize, to collaborate on one or more tasks within the virtual reality applications, or to compete against one another within the virtual environments.

Controllers may generally be used by the user to interact within the virtual environment. Though, in some instances, allowing users to utilize one or more body members (e.g., hands) to interact within virtual environments may enhance the user's virtual reality experience, particularly with respect to, for example, first-person point of view (POV) virtual video games. However, due to a lack of any positioning data being received by the virtual reality device from the body member of the user, certain movements or hand gestures may be difficult to track and determine by the virtual reality device. For example, if the user were to gesture in mid-air to manually interact with a virtual user interface, the user's hand tremors, hand jitters, and more generally any hand motional pattern or hand movement pattern that may be associated with a particular user would prevent the user from providing a command or selection within the virtual reality environment. It may be useful to provide techniques to learn user-specific motional patterns and stabilizing hand gestures in artificial reality environments.

Accordingly, the present embodiments include techniques for learning user-specific motional patterns and stabilizing hand gestures in artificial reality environments, in accordance with the presently disclosed embodiments. In certain embodiments, a computing platform may display an artificial reality environment to a user. In certain embodiments, the computing platform may determine a context in which the user is interacting with the artificial reality environment. For example, in certain embodiments, the computing platform may determine the context in which the user is interacting with the artificial reality environment by determining a trigger for which to commence monitoring the motional patterns of the hand gesture performed by the user with respect to the target virtual object. Indeed, in some embodiments, the determined context may be utilized as a trigger to commence monitoring the motional patterns of the hand gesture performed by the user with respect to the target virtual object and as a means to identify a particular ground truth with respect to the target virtual object by which to evaluate the motional patterns of the hand gesture performed by the user with respect to the target virtual object. In certain embodiments, the computing platform may determine, based on the context, that the user intends to use a hand gesture to interact with a target virtual object within the artificial reality environment. For example, in certain embodiments, the computing platform may determine, based on the context, that the user intends to use the hand gesture to interact with the target virtual object by determining, for example, a time elapsed while the user is attempting to interact with the target virtual object, one or more particular hand movements or wrist movements the user may make with respect to the target virtual object, one or more particular hand poses the user may hold for some time period, one or more particular hand gestures (e.g., handwaving, finger pointing, fist-clutching, signing), one or more sequences of hand poses, and so forth.

In certain embodiments, the computing platform may then monitor, while the user is attempting to interact with the target virtual object, motional patterns of the hand gesture performed by the user with respect to the target virtual object. In certain embodiments, the computing platform may then generate a motion-stabilization profile associated with the user based on the motional patterns, in which the motion-stabilization profile may be utilized to stabilize the hand gesture performed by the user during subsequent user interactions with virtual objects in the artificial reality environment. For example, in some embodiments, the computing platform may utilize a machine learning (ML) model that may receive the motional patterns of hand gestures performed by the user with respect to various target virtual objects while the user is attempting to interact with the various target virtual object and may then utilize the motional patterns to generate the motion-stabilization profile for that particular user. In one embodiment, the motion-stabilization profile may be associated with only the particular user, such that the computing platform may generate N different motion-stabilization profiles for each of N different users.

In certain embodiments, the computing platform may determine a motional range (e.g., distance range, voxel range, pixel range, pose range, and so forth) associated with the user based on the motion-stabilization profile. For example, in certain embodiments, the computing platform may monitor, while the user is attempting to perform subsequent user interactions with virtual objects in the artificial reality environment, a motion of the hand gesture performed by the user with respect to the virtual objects, and may then determine to stabilize the hand gesture performed by the user during the subsequent user interactions with virtual objects in the artificial reality environment when the motion of the band gesture performed by the user exceeds the motional range (e.g., distance range, voxel range, pixel range, pose range, and so forth). In another embodiment, the computing platform may monitor, while the user is attempting to perform subsequent user interactions with virtual objects in the artificial reality environment, a motion of the hand gesture performed by the user with respect to the virtual objects, and may then determine to forgo stabilizing the hand gesture performed by the user during the subsequent user interactions with virtual objects in the artificial reality environment when the motion of the hand gesture performed by the user is within the motional range (e.g., distance range, voxel range, pixel range, pose range, and so forth).

Indeed, the present techniques are provided for learning user-specific motional patterns and stabilizing hand gestures in artificial reality environments. Specifically, the present techniques of learning user-specific motional patterns and stabilizing the user's motional patterns within artificial reality environments may allow, for example, for user body members (e.g., hands, head, limbs, fingers, and so forth) to serve as the sole input modality for the artificial reality devices. For example, in certain embodiments, when the particular user is interacting within artificial reality environments, a hand gesture stabilization process (e.g., executed in the background) may be instantiated on the artificial reality device to learn the particular user's motional patterns, to generate a motion-stabilization profile for the particular user, and then stabilize the hand gesture of the user while the user is interacting with the artificial reality application executing on the artificial reality device. Indeed, the hand gesture stabilization techniques may be implemented utilizing machine learning (ML) models to learn user motional patterns and utilize the learned motional patterns to generate a motion-stabilization profile (e.g., the signature hand tremors, hand jitters, and more generally any learned or observed hand motional pattern or hand movement pattern that may be specific to the particular user). After the user-specific motion-stabilization profile is generated, and a pixel region of interest or range is generated by which the motion-stabilization profile is defined, the computing platform may automatically stabilize the hand gesture performed by the user during the subsequent user interactions with virtual objects in the artificial reality environment when the motion of the hand gesture performed by the user exceeds the motional range (e.g., distance range, voxel range, pixel range, pose range, and so forth). In this way, the present techniques may allow for the user body members, and specifically user's hands, to completely replace all controllers or other physical objects for interacting in artificial reality environments, and may thus enhance the user's experiences in artificial reality environments.

As used herein, "artificial reality" may refer to a form of electronic-based reality that has been manipulated in some manner before presentation to a user, including, for example, virtual reality (VR), augmented reality (AR), mixed reality (MR), hybrid reality, simulated reality, immersive reality, holography, or any combination thereof. For example, "artificial reality" content may include completely computer-generated content or partially computer-generated content combined with captured content (e.g., real-world images). In some embodiments, the "artificial reality" content may also include video, audio, haptic feedback, or some combination thereof, any of which may be presented in a single channel or in multiple channels (such as stereo video that produces a three-dimensional (3D) effect to the viewer). Furthermore, as used herein, it should be appreciated that "artificial reality" may be associated with applications, products, accessories, services, or a combination thereof, that, for example, may be utilized to create content in artificial reality and/or utilized in (e.g., perform activities) an artificial reality. Thus, "artificial reality" content may be implemented on various platforms, including a head-mounted device (HMD) connected to a host computer system, a standalone HMD, a mobile device or computing system, or any other hardware platform capable of providing artificial reality content to one or more viewers.

With the forgoing in mind, it may be useful to describe an example artificial reality system 100 for learning user-specific motional patterns and stabilizing hand gestures in artificial reality environments, as illustrated by FIG. 1. In certain embodiments, the artificial reality system 100 may include a user 102, which may interact with an artificial reality application that may be executing on an artificial reality device 104, for example, worn by the user. For example, as further illustrated by the FIG. 1, the artificial reality system 100 may include an artificial reality device 104 and a computing system 108. The user 102 may wear the artificial reality device 104, which may display visual artificial reality content to the user 102. For example, in one embodiment, the artificial reality device 104 may display to the user 102 various artificial reality applications and/or other artificial reality experiences for the user to interact one or more additional users of artificial reality devices 104. In some embodiments, the artificial reality device 104 may include an audio device that may provide audio artificial reality content to the user 102. The artificial reality device 104 may also include one or more cameras which can capture images and videos of environments. The artificial reality device 104 may include an eye tracking system to determine the vergence distance of the user 102. In some embodiments, the artificial reality device 104 may include a head-mounted display (HMD).

In certain embodiments, as further depicted by FIG. 1, as opposed to utilizing a controller to interact within the artificial reality application executing on the artificial reality device 104, the user 102 may interact using one or more body hands 110 (e.g., hands, head, limbs, fingers, and so forth). For example, in certain embodiments, the artificial reality device 104 may track one or more body hands 110 of the user 102 by impinging light arrays 112 (e.g., infrared (IR) light) onto the one or more hands 110 of the user 102 and determining gestures performed by the user 102 as various inputs to be directed from the user 102 to the computing system 108 and/or the artificial reality device 104 based on captures of reflections of the impinging light arrays 112. The computing system 108 may be connected to the artificial reality device 104 through cables or wireless connections. The computing system 108 may control the artificial reality device 104 to provide the artificial reality content to, and receive inputs from, the user 102 in response to determined users gestures performed by the one or more hands 110 of the user. The computing system 108 may be a standalone host computer system, an on-board computer system integrated with the artificial reality device 104, a mobile electronic device, or any other hardware platform capable of providing artificial reality content to and receiving inputs from the user 102.

Figure 2:
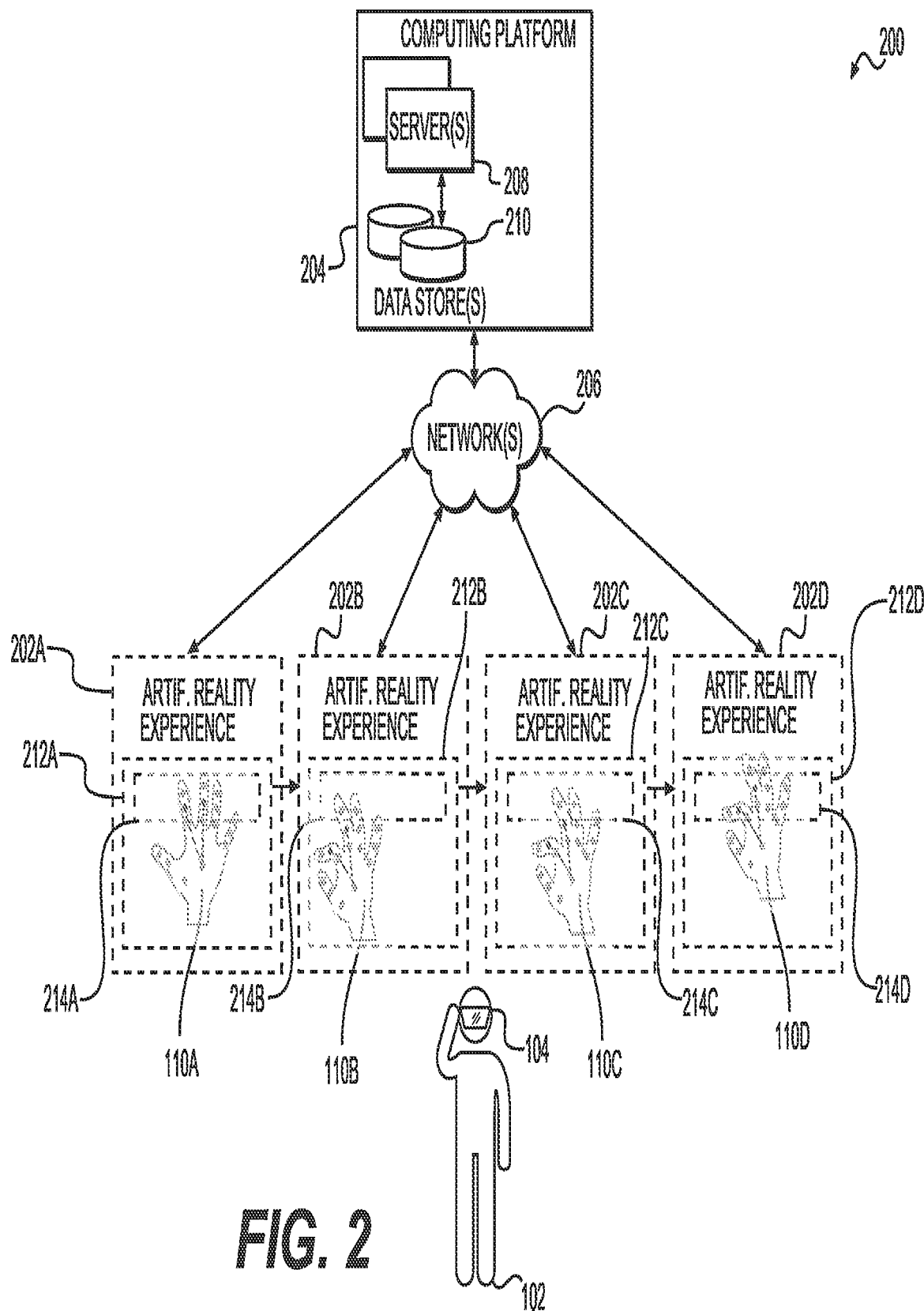
FIG. 2 illustrates an example embodiment of an artificial reality environment.

Turning now to FIG. 2, an artificial reality environment 200 that may be useful in learning user-specific motional patterns and stabilizing hand gestures in artificial reality environments is shown, in accordance with the presently disclosed embodiments. As depicted, the artificial reality environment 200 may include one or more users 102 wearing respective artificial reality devices 104 that may be suitable for allowing the one or more users 102 to engage in artificial reality experiences 202A-202D. Specifically, as depicted by FIG. 2, the artificial reality device 104 may be coupled to a computing platform 204 via one or more network(s) 206. In certain embodiments, the computing platform 204 may include, for example, a cloud-based computing architecture suitable for hosting and servicing the artificial reality experiences 202A-202D executing on the artificial reality device 104. For example, in one embodiment, the computing platform 204 may include a Platform as a Service (PaaS) architecture, a Software as a Service (SaaS) architecture, and an Infrastructure as a Service (IaaS), or other similar cloud-based computing architecture.

In certain embodiments, as further depicted by FIG. 2, the computing platform 204 may include one or more processing devices 208 (e.g., servers) and one or more data stores 210. For example, in some embodiments, the processing devices 208 (e.g., servers) may include one or more general purpose processors, or may include one or more graphic processing units (GPUs), one or more application-specific integrated circuits (ASICs), one or more system-on-chips (SoCs), one or more microcontrollers, one or more field-programmable gate arrays (FPGAs), or any other processing device(s) that may be suitable for providing processing and/or computing support for the artificial reality experiences 202A-202D. Similarly, the data stores 210 may include, for example, one or more internal databases that may be utilized to store information (e.g., user contextual data, user hand 110 movement and gesture data) associated with the one or more users 102.

In certain embodiments, as previously noted, the computing platform 204 may be a hosting and servicing platform for the artificial reality experiences 202A-202D executing on the artificial reality device 104. For example, in some embodiments, the artificial reality experiences 202A-202D (e.g., "Artificial Reality Experience") may include, for example, artificial reality applications such as video gaming applications (e.g., single-player games, multi-player games, first-person point of view (POV) games), mapping applications, music playback applications, video-sharing platform applications, video-streaming applications, e-commerce applications, social media applications, user interface (UI) applications, or other artificial reality applications the users 102 may experience and navigate therethrough.

In certain embodiments, as further depicted by FIG. 2, the computing platform 204 may cause the artificial reality device 104 to display one or more of the artificial reality applications 212A-212D to the user 102. As depicted, in some embodiments, the artificial reality experiences 202A-202D may include a representation of one or more hands 110 of the user 102. Indeed, in accordance with the presently disclosed embodiments, stabilizing hand gesture process may be instantiated on the artificial reality device 104 (e.g., executed in the background with respect to one or more of the artificial reality applications 212A-212D) for the user 102, for example, once the user 102 places on the artificial reality device 104 and begins interacting with one or more of the artificial reality applications 212A-212D to launch on the artificial reality device 104. For example, in certain embodiments, as depicted by the instance of the one or more artificial reality applications 212A-212D, once the user 102 places on the artificial reality device 104, the computing platform 204 may determine a context in which the user 102 is interacting with the one or more artificial reality applications 212A-212D.

For example, in certain embodiments, the computing platform 204 may determine the context in which the user 102 is interacting with the one or more artificial reality applications 212A-212D by determining a trigger for which to commence monitoring motional patterns (e.g., user hand pose, user pinch gestures, user pinch and rotate gestures, wrist movements, finger and joint movements, the user's hands at rest, the user hands during interaction, and so forth) of the one or more hand gestures 110A-110O performed by the user 102 with respect to the one or more target virtual objects 214A-214D. For example, in certain embodiments, the computing platform 204 may determine the context in which the user 102 is interacting with the one or more artificial reality applications 212A-212D by determining a trigger for which to commence monitoring the motional patterns of the hand gesture performed by the user 102 with respect to the one or more target virtual objects 214A-214D.

In certain embodiments, the determined context may be utilized as a trigger to commence monitoring the motional patterns of the hand gesture performed by the user 102 with respect to the target virtual object and as a means to identify a particular ground truth with respect to the one or more target virtual objects 214A-214D by which to evaluate the motional patterns of the one or more hand gestures 110A-110O performed by the user 102 with respect to the one or more target virtual objects 214A-214D. In certain embodiments, the computing platform 204 may determine, based on the context, that the user 102 intends to utilize the one or more hand gestures 110A-110D to interact with one or more target virtual objects 214A-214D within the one or more artificial reality applications 212A-212D. For example, in certain embodiments, the computing platform 204 may determine, based on the context, that the user intends to use the one or more hand gestures 110A-110D to interact with the one or more target virtual objects 214A-214D by determining a time elapsed while the user 102 is attempting to interact with the one or more target virtual objects 214A-214D, one or more particular hand movements or wrist movements the user 102 may make with respect to the one or more target virtual objects 214A-214D, one or more particular hand poses the user 102 may hold for some time period, one or more particular hand gestures (e.g., handwaving, finger pointing, fist-clutching, signing), one or more sequences of hand poses, and so forth.

It should be appreciated that the context may include any contextual data that may be associated with the one or more artificial reality applications 212A-212D, and more particularly, contextual data or other information about how the user 102 may interact with the one or more artificial reality applications 212A-212D (e.g., thus allowing the computing platform 204 to determine the intent of the user 102). For example, in one embodiment, in first-person POV a shooting game, the game might present one or more target virtual objects 214A-214D (e.g., ducks, geese) appearing across the displays of the artificial reality device 104. The motional patterns of the one or more hand gestures 110A-110D performed by the user 102 may only roughly follow the one or more target virtual objects 214A-214D. However, in accordance with the presently disclosed embodiments, simply the fact that a shooting game is showing the one or more target virtual objects 214A-214D (e.g., ducks, geese in a shooting game) and the motional patterns of the one or more hand gestures 110A-110D performed by the user 102 may provide enough context for the computing platform 204 to commence monitoring the motional patterns of the hand gesture performed by the user 102 and to know that the user 102 intends, for example, to shoot the one or more target virtual objects 214A-214D (e.g., ducks, geese in a shooting game). In another example, the user 102 may be presented with a user agreement, and the only way for the user 102 to exit is to select an "AGREE" button, widget, or other 3D virtual object. In accordance with the presently disclosed embodiments, the mere fact that the user 102 is presented with this no-alternative state may be enough for the computing platform 204 to commence monitoring the motional patterns of the hand gesture performed by the user 102 and to know that the user 102 intends, for example, to select the "AGREE" button, widget, or other 3D virtual object.

In certain embodiments, the computing platform 204 may then generate a motion-stabilization profile associated with the user 102 based on the motional patterns, in which the motion-stabilization profile may be utilized to stabilize the one or more hand gestures 110A-110D performed by the user 102 during subsequent user interactions with one or more virtual objects 214A-214D in the artificial reality applications 212A-212D. For example, in some embodiments, the computing platform 102 may utilize a machine learning (ML) model that may receive the motional patterns of the one or more hand gestures 110A-110D performed by the user 102 with respect to various target virtual objects while the user 102 is attempting to interact with the various target virtual objects 214A-214D and may then utilize the motional patterns to generate the motion-stabilization profile for that particular user 102. For example, in one embodiment, the motion-stabilization profile may be associated with only the particular user 102, such that the computing platform 102 may generate N different motion-stabilization profiles for each of N different users.

In certain embodiments, the computing platform 204 may determine a motional range (e.g., distance range, voxel range, pixel range, pose range, and so forth) associated with the user 102 based on the motion-stabilization profile. For example, in certain embodiments, the computing platform 204 may monitor, while the user 102 is attempting to perform subsequent user interactions with virtual objects in the artificial reality environment, a motion of the one or more hand gestures 110A-110D performed by the user 102 with respect to the virtual objects 214A-214D, and may then determine to stabilize the one or more hand gestures 110A-110D performed by the user 102 during the subsequent user interactions with other virtual objects 214A-214D in the one or more artificial reality applications 212A-212D when the motion of the one or more hand gestures performed by the user exceeds the determined motional range (e.g., distance range, voxel range, pixel range, pose range, and so forth) associated with the user 102. In another embodiment, the computing platform 204 may determine monitor, while the user 102 is attempting to perform subsequent user interactions with virtual objects 214A-214D in the one or more artificial reality applications 212A-212D, a motion of the one or more hand gestures 110A-110D performed by the user 102 with respect to the virtual objects 214A-214D, and may then determine to forgo stabilizing the one or more hand gestures 110A-110D performed by the user 102 during the subsequent user 102 interactions with virtual objects 214A-214D in the one or more artificial reality applications 212A-212D when the motion of the one or more hand gestures 110A-110D performed by the user 102 is within the motional range.

In certain embodiments, the motional range may include, for example, a voxel region of interest (e.g., subregion of 3×3×3 voxels, 5×5×5 voxels, 10×10×10 voxels, and so forth) that may be generated by the ML model of the computing platform 204 that is specific to the particular user 102. In certain embodiments, the ML model of the computing platform 204 may calculate a suitable hand pose range, which may include, for example, the amount of hand pose translation and rotation that may allow the computing platform 204 to determine whether to stabilize the one or more hand gestures 110A-110D performed by the user 102 during the subsequent user 102 interactions with virtual objects 214A-214D in the one or more artificial reality applications 212A-212D or to forgo stabilizing the one or more hand gestures 110A-110D performed by the user 102 during the subsequent user 102 interactions with virtual objects 214A-

214D in the one or more artificial reality applications 212A-212D (e.g., based on whether the motion of the one or more hand gestures 110A-110D performed by the user 102 is within the motional range). In certain embodiments, based on the determined mobile-stabilization profiles, the computing platform 204 may adjust the hand pose of the one or more hands 110B, 110C to compensate for the mobile-stabilization profile based on the motional range (e.g., distance range, voxel range, pixel range, pose range, and so forth).

Accordingly, the present techniques are provided for learning user-specific motional patterns and stabilizing the one or more hand gestures 110A-110D performed by the user 102 in the one or more artificial reality applications 212A-212D. Specifically, the present techniques of learning user-specific motional patterns and stabilizing the user's motional patterns within one or more artificial reality applications 212A-212D may allow, for example, for user body members (e.g., hands, head, limbs, fingers, and so forth) to serve as the sole input modality for the artificial reality device 104. For example, as discussed above, when the particular user 102 is interacting within the one or more artificial reality applications 212A-212D, a hand gesture stabilization process may be instantiated on the artificial reality device 104 to learn the particular user's motional patterns, to generate a motion-stabilization profile for the particular user 102, and then to determine whether to stabilize the one or more hand gestures 110A-110D of the user 102 while the user 102 is interacting with the one or more artificial reality applications 212A-212D executing on the artificial reality device 104.

Indeed, the hand gesture stabilization techniques may be implemented utilizing one or ML models to learn user motional patterns and utilize the learned motional patterns to generate a motion-stabilization profile (e.g., the signature hand tremors, hand jitters, and more generally any learned or observed hand motional pattern or hand movement pattern that may be specific to the particular user 102). After the user-specific motion-stabilization profile is generated, and a pixel region of interest or range is generated by which the motion-stabilization profile is defined, the computing platform 102 may automatically stabilize the one or more hand gestures 110A-110D performed by the user 102 during the subsequent user interactions with virtual objects 214A-214D in the artificial reality environment when the motion of the hand gesture performed by the user exceeds the motional range (e.g., distance range, voxel range, pixel range, pose range, and so forth). In this way, the present techniques may allow for the user body members, and specifically the hands of the user 102, to completely replace all controllers or other physical objects for interacting in artificial reality applications 212A-212D, and may thus enhance the user's experiences in artificial reality applications 212A-212D.

Figure 3:
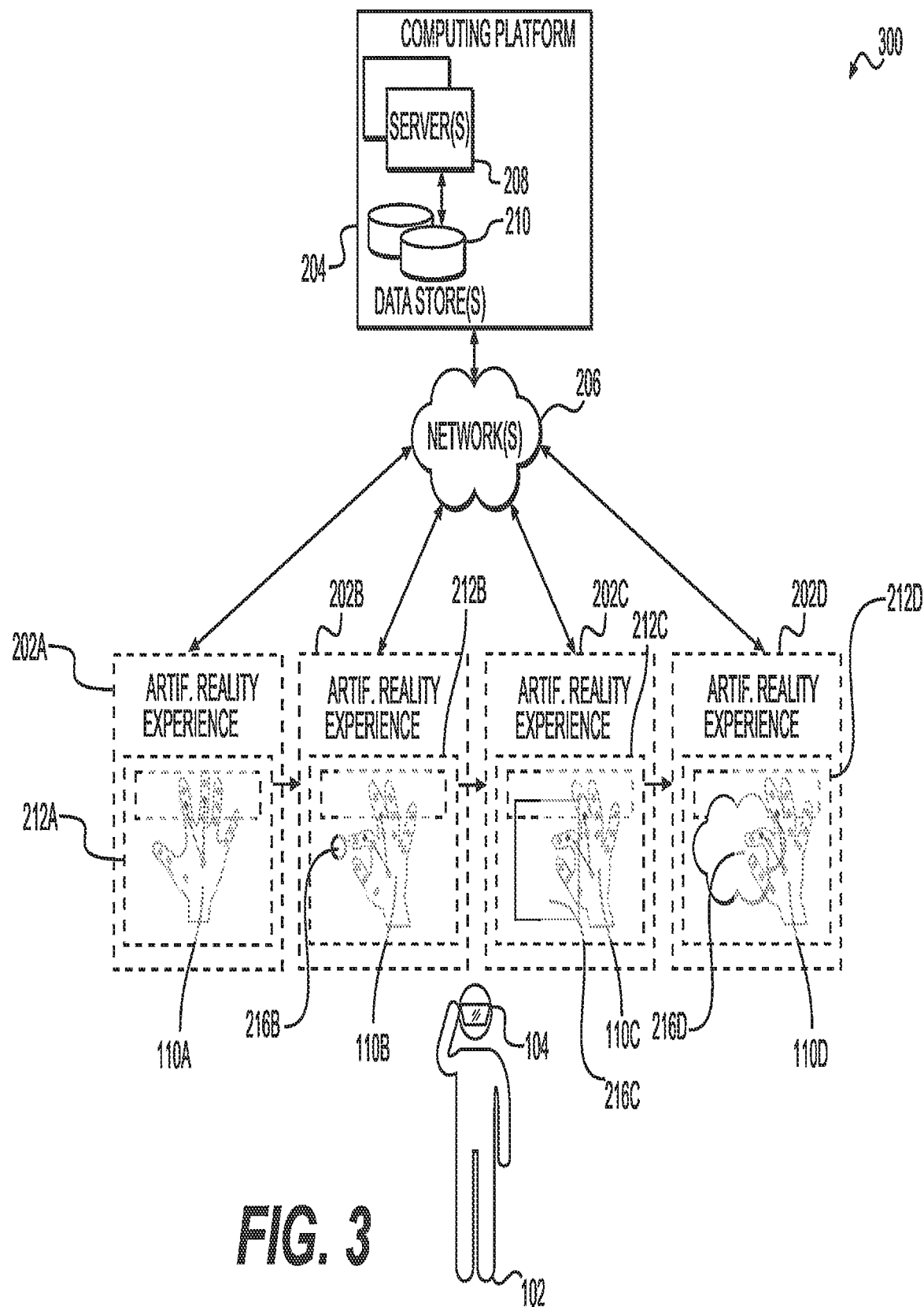
FIG. 3 illustrates another example embodiment of an artificial reality environment.

FIG. 3 illustrates another embodiment an artificial reality environment 300 that may be useful in learning user-specific motional patterns and stabilizing hand gestures in artificial reality environments, in accordance with the presently disclosed embodiments. Specifically, FIG. 3 may represent a calibration process that may be performed in conjunction with the background process discussed above with respect to FIG. 2, or in lieu of the background process discussed above with respect to FIG. 2. For example, the artificial reality experiences 202A-202D examples illustrate a multi-stage calibration process (e.g., that increases in complexity) that may be useful in determining and compensating for the mobile-stabilization profile associated with the one or more hands 110A-110D of the particular user 102.

For example, the calibration process examples with respect to artificial reality experiences 202A-202D may include a first example stage in which the one or more hands 110A of the user 102 are represented in the one or more artificial reality applications 212A-212D, another example stage in which the user 102 is prompted to select a target virtual object 216B, another example stage in which the user 102 is prompted to select a target virtual object 216C, and a final example stage in which the user 102 is prompted to select a target virtual object 216D. For example, as depicted by FIG. 3, in the first example stage as represented by the one or more artificial reality applications 212A-212D, the user 102 may be instructed to keep her one or hands 110A still for the first few rendered frames or seconds after placing on the artificial reality device 104. In the second example stage as represented by the artificial reality application 212B, the user 102 may be instructed to utilize her one or hands 110B to select a relatively smaller target virtual object 216B.

In particular embodiments, increasing in user interaction complexity, in the third example stage as represented by the artificial reality application 212C, the user 102 may be instructed to utilize her one or hands 110C to select a larger target virtual object 216C (e.g., as compared to the target virtual object 216B). Further increasing in user interaction complexity, in the final example stage as represented by the artificial reality application 212D, the user 102 may be instructed to utilize her one or hands 110D to select an even larger and more complex target virtual object 216D (e.g., as compared to the selectable objects 216B and 216C). Thus, in certain embodiments, the computing platform 204 may monitor, while the user 102 is attempting to interact with the target virtual objects 216B, 216C, and 216D, the motional patterns of the hand gestures 110B-110D performed by the user 102 with respect to the respective target virtual objects 216B, 216C, and 216D. In certain embodiments, the computing platform 204 may then generate a motion-stabilization profile associated with the user 102 based on the motional patterns, in which the motion-stabilization profile may be utilized to stabilize the hand gestures 110B-110D performed by the user 102 during subsequent user interactions with virtual objects in the artificial reality applications 212B-212D.

As such, the present techniques are provided for learning user-specific motional patterns and stabilizing the one or more hand gestures 110A-110D performed by the user 102 in the one or more artificial reality applications 212A-212D. Specifically, the present techniques of learning user-specific motional patterns and stabilizing the user's motional patterns within one or more artificial reality applications 212A-212D may allow, for example, for user body members (e.g., hands, head, limbs, fingers, and so forth) to serve as the sole input modality for the artificial reality device 104. For example, as discussed above, when the particular user 102 is interacting within the one or more artificial reality applications 212A-212D, a hand gesture stabilization process may be instantiated on the artificial reality device 104 to learn the particular user's motional patterns, to generate a motion-stabilization profile for the particular user 102, and then to determine whether to stabilize the one or more hand gestures 110A-110D of the user 102 while the user 102 is interacting with the one or more artificial reality applications 212A-212D executing on the artificial reality device 104.

Indeed, the hand gesture stabilization techniques may be implemented utilizing one or ML models to learn user motional patterns and utilize the learned motional patterns to generate a motion-stabilization profile (e.g., the signature hand tremors, hand jitters, and more generally any learned or observed hand motional pattern or hand movement pattern that may be specific to the particular user 102). After the user-specific motion-stabilization profile is generated, and a pixel region of interest or range is generated by which the motion-stabilization profile is defined, the computing platform 102 may automatically stabilize the one or more hand gestures 110A-110D performed by the user 102 during the subsequent user interactions with virtual objects 214A-214D in the artificial reality environment when the motion of the hand gesture performed by the user exceeds the motional range (e.g., distance range, voxel range, pixel range, pose range, and so forth). In this way, the present techniques may allow for the user body members, and specifically the hands of the user 102, to completely replace all controllers or other physical objects for interacting in artificial reality applications 212A-212D, and may thus enhance the user's experiences in artificial reality applications 212A-212D.

Figure 4:
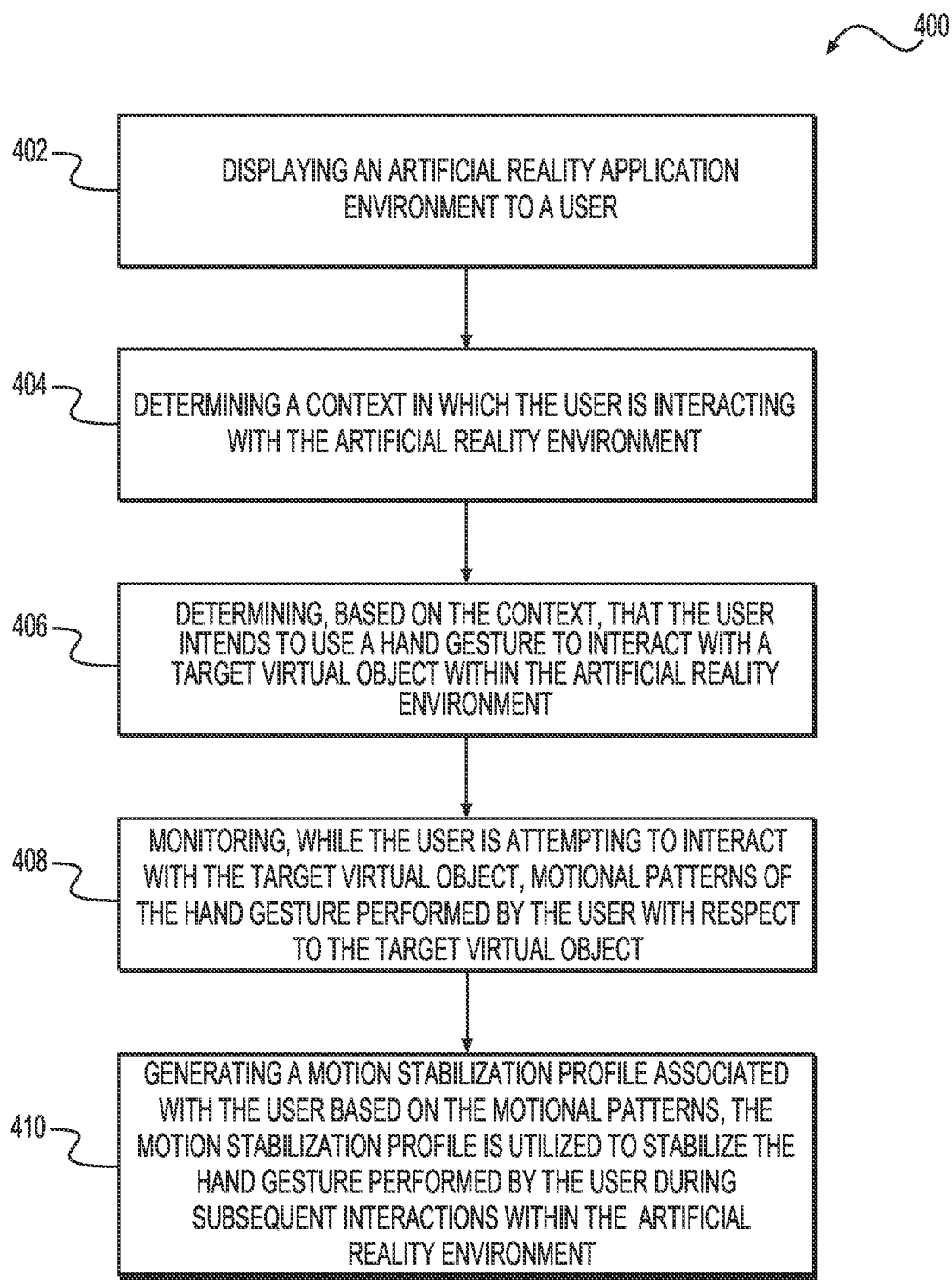
FIG. 4 illustrates a flow diagram of a method for learning user-specific motional patterns and stabilizing hand gestures in artificial reality environments.

FIG. 4 illustrates a flow diagram of a method 400 for learning user-specific motional patterns and stabilizing hand gestures in artificial reality environments, in accordance with presently disclosed techniques. The method 400 may be performed utilizing one or more processing devices (e.g., computing platform 104) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof.

The method 400 may begin at block 402 with one or more processing devices (e.g., computing platform 104) displaying an artificial reality environment to a user. The method 400 may then continue at block 404 with the one or more processing devices (e.g., computing platform 104) determining a context in which the user is interacting with the artificial reality environment. The method 400 may then continue at block 406 with the one or more processing devices (e.g., computing platform 104) determining, based on the context, that the user intends to use a hand gesture to interact with a target virtual object within the artificial reality environment. The method 400 may then continue at block 408 with the one or more processing devices (e.g., computing platform 104) monitoring, while the user is attempting to interact with the target virtual object, motional patterns of the hand gesture performed by the user with respect to the target virtual object. The method 400 may then conclude at block 410 with the one or more processing devices (e.g., computing platform 104) generating a motion-stabilization profile associated with the user based on the motional patterns, wherein the motion-stabilization profile is configured to be utilized to stabilize the hand gesture performed by the user during subsequent user interactions with virtual objects in the artificial reality environment.

Accordingly, as described by the method 400 of FIG. 4, the present techniques are directed toward learning user-specific motional patterns and stabilizing hand gestures in artificial reality environments, in accordance with the presently disclosed embodiments. In certain embodiments, a computing platform may display an artificial reality environment to a user. In certain embodiments, the computing platform may determine a context in which the user is interacting with the artificial reality environment. For example, in certain embodiments, the computing platform may determine the context in which the user is interacting with the artificial reality environment by determining a trigger for which to commence monitoring the motional patterns of the hand gesture performed by the user with respect to the target virtual object. Indeed, in some embodiments, the determined context may be utilized as a trigger to commence monitoring the motional patterns of the hand gesture performed by the user with respect to the target virtual object and as a means to identify a particular ground truth with respect to the target virtual object by which to evaluate the motional patterns of the hand gesture performed by the user with respect to the target virtual object. In certain embodiments, the computing platform may determine, based on the context, that the user intends to use a hand gesture to interact with a target virtual object within the artificial reality environment. For example, in certain embodiments, the computing platform may determine, based on the context, that the user intends to use the hand gesture to interact with the target virtual object by determining, for example, a time elapsed while the user is attempting to interact with the target virtual object, one or more particular hand movements or wrist movements the user may make with respect to the target virtual object, one or more particular hand poses the user may hold for some time period, one or more particular hand gestures (e.g., handwaving, finger pointing, fist-clutching, signing), one or more sequences of poses, and so forth.

In certain embodiments, the computing platform may then monitor, while the user is attempting to interact with the target virtual object, motional patterns of the hand gesture performed by the user with respect to the target virtual object. In certain embodiments, the computing platform may then generate a motion-stabilization profile associated with the user based on the motional patterns, in which the motion-stabilization profile may be utilized to stabilize the hand gesture performed by the user during subsequent user interactions with virtual objects in the artificial reality environment. For example, in some embodiments, the computing platform may utilize a machine learning (ML) model that may receive the motional patterns of hand gestures performed by the user with respect to various target virtual objects while the user is attempting to interact with the various target virtual object and may then utilize the motional patterns to generate the motion-stabilization profile for that particular user. In one embodiment, the motion-stabilization profile may be associated with only the particular user, such that the computing platform may generate N different motion-stabilization profiles for each of N different users.

In certain embodiments, the computing platform may determine a motional range (e.g., distance range, voxel range, pixel range, pose range, and so forth) associated with the user based on the motion-stabilization profile. For example, in certain embodiments, the computing platform may monitor, while the user is attempting to perform subsequent user interactions with virtual objects in the artificial reality environment, a motion of the hand gesture performed by the user with respect to the virtual objects, and may then determine to stabilize the hand gesture performed by the user during the subsequent user interactions with virtual objects in the artificial reality environment when the motion of the hand gesture performed by the user exceeds the motional range (e.g., distance range, voxel range, pixel range, pose range, and so forth). In another embodiment, the computing platform may determine monitor, while the user is attempting to perform subsequent user interactions with virtual objects in the artificial reality environment, a motion of the hand gesture performed by the user with respect to the virtual objects, and may then determine to forgo stabilizing the hand gesture performed by the user during the subsequent user interactions with virtual objects in the artificial reality environment when the motion of the hand gesture performed by the user is within the motional range (e.g., distance range, voxel range, pixel range, pose range, and so forth).

Accordingly, the present techniques are provided for learning user-specific motional patterns and stabilizing hand gestures in artificial reality environments. Specifically, the present techniques of learning user-specific motional patterns and stabilizing the user's motional patterns within artificial reality environments may allow, for example, for user body members (e.g., hands, head, limbs, fingers, and so forth) to serve as the sole input modality for the artificial reality devices. For example, in certain embodiments, when the particular user is interacting within artificial reality environments, a hand gesture stabilization process may be instantiated on the artificial reality device to learn the particular user's motional patterns, to generate a motion-stabilization profile for the particular user, and then stabilize the hand gesture of the user while the user is interacting with the artificial reality application executing on the artificial reality device. Indeed, the hand gesture stabilization techniques may be implemented utilizing machine learning (ML) models to learn user motional patterns and utilize the learned motional patterns to generate a motion-stabilization profile (e.g., the signature hand tremors, hand jitters, and more generally any learned or observed hand motional pattern or hand movement pattern that may be specific to the particular user). After the user-specific motion-stabilization profile is generated, and a pixel region of interest or range is generated by which the motion-stabilization profile is defined, the computing platform may automatically stabilize the hand gesture performed by the user during the subsequent user interactions with virtual objects in the artificial reality environment when the motion of the hand gesture performed by the user is within the motional range (e.g., distance range, voxel range, pixel range, pose range, and so forth). In this way, the present techniques may allow for the user body members, and specifically user's hands, to completely replace all controllers or other physical objects for interacting in artificial reality environments, and may thus enhance the user's experiences in artificial reality environments.

Figure 5:
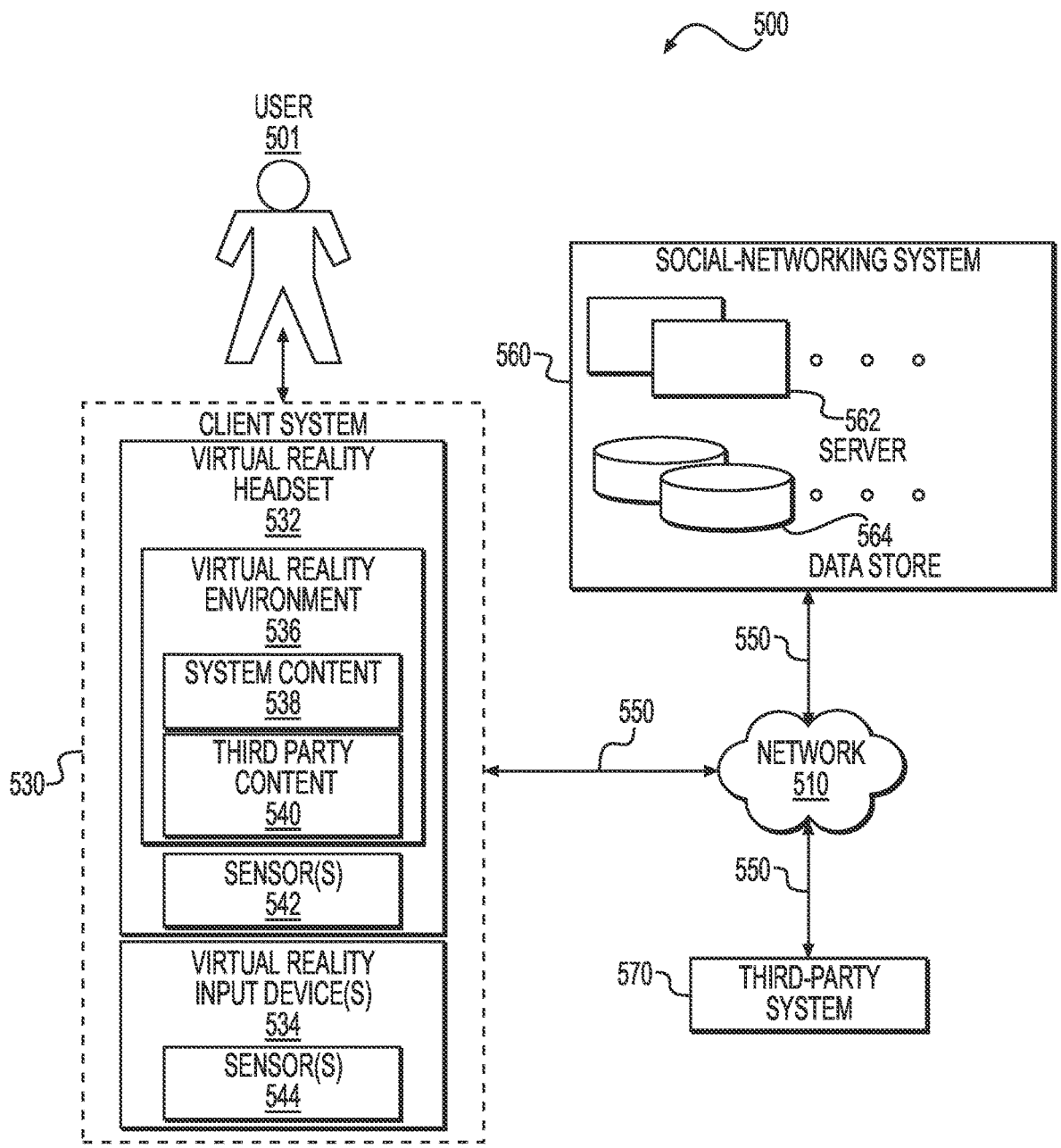
FIG. 5 illustrates an example network environment associated with a virtual reality system.

FIG. 5 illustrates an example network environment 500 associated with a virtual reality system. Network environment 500 includes a user 501 interacting with a client system 530, a social-networking system 560, and a third-party system 570 connected to each other by a network 510. Although FIG. 5 illustrates a particular arrangement of a user 501, a client system 530, a social-networking system 560, a third-party system 570, and a network 510, this disclosure contemplates any suitable arrangement of a user 501, a client system 530, a social-networking system 560, a third-party system 570, and a network 510. As an example, and not by way of limitation, two or more of users 501, a client system 530, a social-networking system 560, and a third-party system 570 may be connected to each other directly, bypassing a network 510. As another example, two or more of client systems 530, a social-networking system 560, and a third-party system 570 may be physically or logically co-located with each other in whole or in part. Moreover, although FIG. 5 illustrates a particular number of users 501, client systems 530, social-networking systems 560, third-party systems 570, and networks 510, this disclosure contemplates any suitable number of client systems 530, social-networking systems 560, third-party systems 570, and networks 510. As an example, and not by way of limitation, network environment 500 may include multiple users 501, client systems 530, social-networking systems 560, third-party systems 570, and networks 510.

This disclosure contemplates any suitable network 510. As an example, and not by way of limitation, one or more portions of a network 510 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 510 may include one or more networks 510. Links 550 may connect a client system 530, a social-networking system 560, and a third-party system 570 to a communication network 510 or to each other. This disclosure contemplates any suitable links 550. In certain embodiments, one or more links 550 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In certain embodiments, one or more links 550 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 550, or a combination of two or more such links 550. Links 550 need not necessarily be the same throughout a network environment 500. One or more first links 550 may differ in one or more respects from one or more second links 550.

In certain embodiments, a client system 530 may be an electronic device including hardware, software, or embedded logic components or a combination of two or more such components and capable of carrying out the appropriate functionalities implemented or supported by a client system 530. As an example, and not by way of limitation, a client system 530 may include a computer system such as a desktop computer, notebook or laptop computer, netbook, a tablet computer, e-book reader, GPS device, camera, personal digital assistant (PDA), handheld electronic device, cellular telephone, smartphone, virtual reality headset and controllers, other suitable electronic device, or any suitable combination thereof. This disclosure contemplates any suitable client systems 530. A client system 530 may enable a network user at a client system 530 to access a network 510. A client system 530 may enable its user to communicate with other users at other client systems 530. A client system 530 may generate a virtual reality environment for a user to interact with content.

In certain embodiments, a client system 530 may include a virtual reality (or augmented reality) headset 532, and virtual reality input device(s) 534, such as a virtual reality controller. A user at a client system 530 may wear the virtual reality headset 532 and use the virtual reality input device(s) to interact with a virtual reality environment 536 generated by the virtual reality headset 532. Although not shown, a client system 530 may also include a separate processing computer and/or any other component of a virtual reality system. A virtual reality headset 532 may generate a virtual reality environment 536, which may include system content 538 (including but not limited to the operating system), such as software or firmware updates and also include third-party content 540, such as content from applications or dynamically downloaded from the Internet (e.g., web page content). A virtual reality headset 532 may include sensor(s) 542, such as accelerometers, gyroscopes, magnetometers to generate sensor data that tracks the location of the headset device 532. The headset 532 may also include eye trackers for tracking the position of the user's eyes or their viewing directions. The client system may use data from the sensor(s) 542 to determine velocity, orientation, and gravitation forces with respect to the headset.

Virtual reality input device(s) 534 may include sensor(s) 544, such as accelerometers, gyroscopes, magnetometers, and touch sensors to generate sensor data that tracks the location of the input device 534 and the positions of the user's fingers. The client system 530 may make use of outside-in tracking, in which a tracking camera (not shown) is placed external to the virtual reality headset 532 and within the line of sight of the virtual reality headset 532. In outside-in tracking, the tracking camera may track the location of the virtual reality headset 532 (e.g., by tracking one or more infrared LED markers on the virtual reality headset 532). Alternatively, or additionally, the client system 530 may make use of inside-out tracking, in which a tracking camera (not shown) may be placed on or within the virtual reality headset 532 itself. In inside-out tracking, the tracking camera may capture images around it in the real world and may use the changing perspectives of the real world to determine its own position in space.

Third-party content 540 may include a web browser, such as MICROSOFT INTERNET EXPLORER, GOOGLE CHROME or MOZILLA FIREFOX, and may have one or more add-ons, plug-ins, or other extensions, such as TOOL-BAR or YAHOO TOOLBAR. A user at a client system 530 may enter a Uniform Resource Locator (URL) or other address directing a web browser to a particular server (such as server 562, or a server associated with a third-party system 570), and the web browser may generate a Hyper Text Transfer Protocol (HTTP) request and communicate the HTTP request to server. The server may accept the HTTP request and communicate to a client system 530 one or more Hyper Text Markup Language (HTML) files responsive to the HTTP request. The client system 530 may render a web interface (e.g. a webpage) based on the HTML files from the server for presentation to the user. This disclosure contemplates any suitable source files. As an example, and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In certain embodiments, the social-networking system 560 may be a network-addressable computing system that can host an online social network. The social-networking system 560 may generate, store, receive, and send social-networking data, such as, for example, user-profile data, concept-profile data, social-graph information, or other suitable data related to the online social network. The social-networking system 560 may be accessed by the other components of network environment 500 either directly or via a network 510. As an example, and not by way of limitation, a client system 530 may access the social-networking system 560 using a web browser of a third-party content 540, or a native application associated with the social-networking system 560 (e.g., a mobile social-networking application, a messaging application, another suitable application, or any combination thereof) either directly or via a network 510. In certain embodiments, the social-networking system 560 may include one or more servers 562. Each server 562 may be a unitary server or a distributed server spanning multiple computers or multiple datacenters. Servers 562 may be of various types, such as, for example and without limitation, web server, news server, mail server, message server, advertising server, file server, application server, exchange server, database server, proxy server, another server suitable for performing functions or processes described herein, or any combination thereof.

In certain embodiments, each server 562 may include hardware, software, or embedded logic components or a combination of two or more such components for carrying out the appropriate functionalities implemented or supported by server 562. In certain embodiments, the social-networking system 560 may include one or more data stores 564. Data stores 564 may be used to store various types of information. In certain embodiments, the information stored in data stores 564 may be organized according to specific data structures. In certain embodiments, each data store 564 may be a relational, columnar, correlation, or other suitable database. Although this disclosure describes or illustrates particular types of databases, this disclosure contemplates any suitable types of databases. Certain embodiments may provide interfaces that enable a client system 530, a social-networking system 560, or a third-party system 570 to manage, retrieve, modify, add, or delete, the information stored in data store 564.

In certain embodiments, the social-networking system 560 may store one or more social graphs in one or more data stores 564. In certain embodiments, a social graph may include multiple nodes—which may include multiple user nodes (each corresponding to a particular user) or multiple concept nodes (each corresponding to a particular concept)—and multiple edges connecting the nodes. The social-networking system 560 may provide users of the online social network the ability to communicate and interact with other users. In certain embodiments, users may join the online social network via the social-networking system 560 and then add connections (e.g., relationships) to a number of other users of the social-networking system 560 whom they want to be connected to. Herein, the term "friend" may refer to any other user of the social-networking system 560 with whom a user has formed a connection, association, or relationship via the social-networking system 560.

In certain embodiments, the social-networking system 560 may provide users with the ability to take actions on various types of items or objects, supported by the social-networking system 560. As an example, and not by way of limitation, the items and objects may include groups or social networks to which users of the social-networking system 560 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 560 or by an external system of a third-party system 570, which is separate from the social-networking system 560 and coupled to the social-networking system 560 via a network 510.

In certain embodiments, the social-networking system 560 may be capable of linking a variety of entities. As an example, and not by way of limitation, the social-networking system 560 may enable users to interact with each other as well as receive content from third-party systems 570 or other entities, or to allow users to interact with these entities through an application programming interfaces (API) or other communication channels. In certain embodiments, a third-party system 570 may include one or more types of servers, one or more data stores, one or more interfaces, including but not limited to AP is, one or more web services, one or more content sources, one or more networks, or any other suitable components, e.g., that servers may communicate with. A third-party system 570 may be operated by a different entity from an entity operating the social-networking system 560. In certain embodiments, however, the social-networking system 560 and third-party systems 570 may operate in conjunction with each other to provide social-networking services to users of the social-networking system 560 or third-party systems 570. In this sense, the social-networking system 560 may provide a platform, or backbone, which other systems, such as third-party systems 570, may use to provide social-networking services and functionality to users across the Internet.

In certain embodiments, a third-party system 570 may include a third-party content object provider. A third-party content object provider may include one or more sources of content objects, which may be communicated to a client system 530. As an example, and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In certain embodiments, the social-networking system 560 also includes user-generated content objects, which may enhance a user's interactions with the social-networking system 560. User-generated content may include anything a user can add, upload, send, or "post" to the social-networking system 560. As an example, and not by way of limitation, a user communicates posts to the social-networking system 560 from a client system 530. Posts may include data such as status updates or other textual data, location information, photos, videos, links, music or other similar data or media. Content may also be added to the social-networking system 560 by a third-party through a "communication channel," such as a newsfeed or stream. In certain embodiments, the social-networking system 560 may include a variety of servers, sub-systems, programs, modules, logs, and data stores. In certain embodiments, the social-networking system 560 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 560 may also include suitable components such as network interfaces, security mechanisms, load balancers, failover servers, management-and-network-operations consoles, other suitable components, or any suitable combination thereof.

In certain embodiments, the social-networking system 560 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example, and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 560 to one or more client systems 530 or one or more third-party systems 570 via a network 510. The web server may include a mail server or other messaging functionality for receiving and routing messages between the social-networking system 560 and one or more client systems 530. An API-request server may allow a third-party system 570 to access information from the social-networking system 560 by calling one or more APIs. An action logger may be used to receive communications from a web server about a user's actions on or off the social-networking system 560.

In conjunction with the action log, a third-party-content-object log may be maintained of user exposures to third-party-content objects. A notification controller may provide information regarding content objects to a client system 530. Information may be pushed to a client system 530 as notifications, or information may be pulled from a client system 530 responsive to a request received from a client system 530. Authorization servers may be used to enforce one or more privacy settings of the users of the social-networking system 560. A privacy setting of a user determines how particular information associated with a user can be shared. The authorization server may allow users to opt in to or opt out of having their actions logged by the social-networking system 560 or shared with other systems (e.g., a third-party system 570), such as, for example, by setting appropriate privacy settings. Third-party-content-object stores may be used to store content objects received from third parties, such as a third-party system 570. Location stores may be used for storing location information received from client systems 530 associated with users. Advertisement-pricing modules may combine social information, the current time, location information, or other suitable information to provide relevant advertisements, in the form of notifications, to a user.

Figure 6:
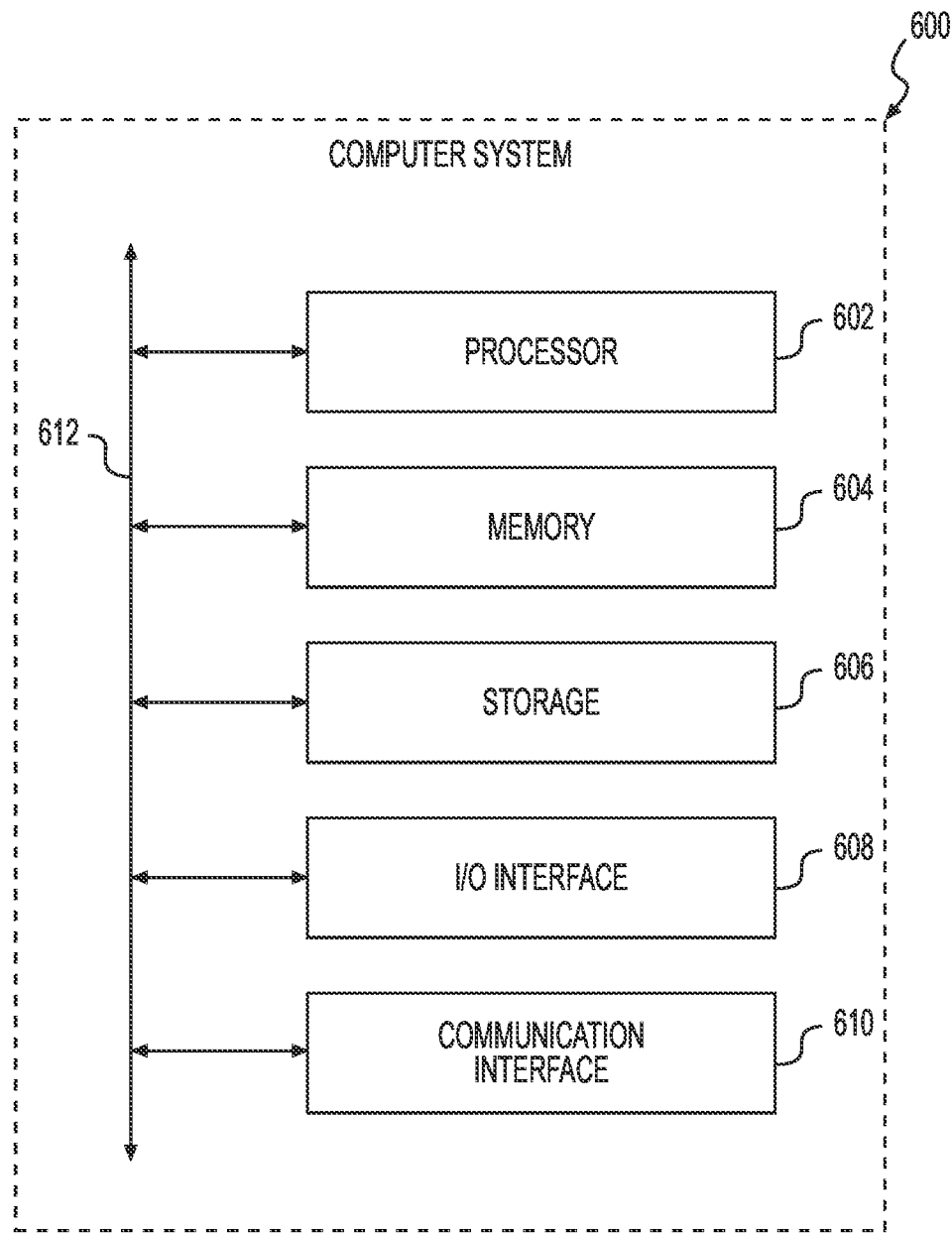
FIG. 6 illustrates an example computer system.

FIG. 6 illustrates an example computer system 600 that may be useful in performing one or more of the foregoing techniques as presently disclosed herein. In certain embodiments, one or more computer systems 600 perform one or more steps of one or more methods described or illustrated herein. In certain embodiments, one or more computer systems 600 provide functionality described or illustrated herein. In certain embodiments, software running on one or more computer systems 600 performs one or more steps of one or more methods described or illustrated herein or provides functionality described or illustrated herein. Certain embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein.

As an example, and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate. In certain embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In certain embodiments, processor 602 includes hardware for executing instructions, such as those making up a computer program. As an example, and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In certain embodiments, processor 602 may include one or more internal caches for data, instructions, or addresses. This disclosure contemplates processor 602 including any suitable number of any suitable internal caches, where appropriate. As an example, and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602.

Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In certain embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In certain embodiments, memory 604 includes main memory for storing instructions for processor 602 to execute or data for processor 602 to operate on. As an example, and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In certain embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere).

One or more memory buses (which may each include an address bus and a data bus) may couple processor 602 to memory 604. Bus 612 may include one or more memory buses, as described below. In certain embodiments, one or more memory management units (MMUs) reside between processor 602 and memory 604 and facilitate accesses to memory 604 requested by processor 602. In certain embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In certain embodiments, storage 606 includes mass storage for data or instructions. As an example, and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In certain embodiments, storage 606 is non-volatile, solid-state memory. In certain embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In certain embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In certain embodiments, communication interface 610 includes hardware, software, or both providing one or more interfaces for communication (such as, for example, packet-based communication) between computer system 600 and one or more other computer systems 600 or one or more networks. As an example, and not by way of limitation, communication interface 610 may include a network interface controller (NIC) or network adapter for communicating with an Ethernet or other wire-based network or a wireless NIC (WNIC) or wireless adapter for communicating with a wireless network, such as a Wi-Fi network. This disclosure contemplates any suitable network and any suitable communication interface 610 for it.

As an example, and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In certain embodiments, bus 612 includes hardware, software, or both coupling components of computer system 600 to each other. As an example, and not by way of limitation, bus 612 may include an Accelerated Graphics Port (AGP) or other graphics bus, an Enhanced Industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates certain embodiments as providing particular advantages, certain embodiments may provide none, some, or all of these advantages.

What is claimed is:

1. A method comprising, by a computing system:
monitoring motional patterns of a user's hand during an interaction between the user's hand and a target virtual object, wherein the interaction relates to a first hand gesture performed by the user in relation to the target virtual object in an artificial reality environment presented to the user by an artificial reality device; and based on at least the monitored motional patterns of the user's hand, generating a motion-stabilization profile associated with the user, wherein the motion-stabilization profile is configured to stabilize input associated with a motion of the user's hand during a subsequent user interaction within the artificial reality environment.

2. The method of claim 1, further comprising determining a trigger for commencing the monitoring of the motional patterns of the user's hand.

3. The method of claim 2, wherein the trigger comprises a context in which the user is interacting with the target virtual object.

4. The method of claim 1, further comprising determining a motional range associated with the user based on the motion-stabilization profile.

5. The method of claim 4, the method further comprising:
stabilizing a second hand gesture performed by the user during the subsequent user interaction within the artificial reality environment based on a determination that the motion of the user's hand exceed the motional range.

6. The method of claim 4, the method further comprising:
forgoing stabilizing a second hand gesture performed by the user during the subsequent user interaction within the artificial reality environment based on a determination that the motion of the user's hand are within the motional range.

7. The method of claim 1, further comprising:
monitoring second motional patterns of the user's hand during a second interaction between the user's hand and a second target virtual object, wherein the second interaction relates to a second hand gesture performed by the user in relation to the second target virtual object, wherein the motion-stabilization profile is further based at least in part on the monitored second motional patterns of the user's hand.

8. The method of claim 1, wherein the artificial reality device is a virtual reality headset.

9. The method of claim 1, wherein the motion-stabilization profile associated with the user is generated utilizing a machine learning model trained on at least the monitored motional patterns of the user's hand.

10. The method of claim 1, wherein the target virtual object is a virtual user interface element.

11. A non-transitory, non-volatile computer-readable medium comprising instructions that, when executed by one or more processors of a computing system, cause the computing system to:
monitor motional patterns of a user's hand during an interaction between the user's hand and a target virtual object, wherein the interaction relates to a first hand gesture performed by the user in relation to the target virtual object in an artificial reality environment presented to the user by an artificial reality device; and
based on at least the monitored motional patterns of the user's hand, generate a motion-stabilization profile associated with the user, wherein the motion-stabilization profile is configured to stabilize input associated with a motion of the user's hand during a subsequent user interaction within the artificial reality environment.

12. The non-transitory, non-volatile computer-readable medium of claim 11, wherein the instructions, when executed by one or more processors of the computing system, further cause the computing system to:
determine a trigger for commencing the monitoring of the motional patterns of the user's hand.

13. The non-transitory, non-volatile computer-readable medium of claim 12, wherein the trigger comprises a context in which the user is interacting with the target virtual object.

14. The non-transitory, non-volatile computer-readable medium of claim 11, wherein the instructions, when executed by one or more processors of the computing system, further cause the computing system to:
determine a motional range associated with the user based on the motion-stabilization profile.

15. The non-transitory, non-volatile computer-readable medium of claim 11, wherein the motion-stabilization profile associated with the user is generated utilizing a machine learning model trained on at least the monitored motional patterns of the user's hand.

16. A system, comprising:
one or more processors; and
one or more non-transitory, non-volatile computer readable media storing instructions that, when executed by at least one of the one or more processors, cause the system to:
monitor motional patterns of a user's hand during an interaction between the user's hand and a target virtual object, wherein the interaction relates to a first hand gesture performed by the user in relation to the target virtual object in an artificial reality environment presented to the user by an artificial reality device; and
based on at least the monitored motional patterns of the user's hand, generate a motion-stabilization profile associated with the user, wherein the motion-stabilization profile is configured to stabilize input associated with a motion of the user's hand during a subsequent user interaction within the artificial reality environment.

17. The system of claim 16, wherein the instructions, when executed by at least one of the one or more processors, further cause the system to:
determine a trigger for commencing the monitoring of the motional patterns of the user's hand.

18. The system of claim 17, wherein the trigger comprises a context in which the user is interacting with the target virtual object.

19. The system of claim 16, wherein the instructions, when executed by at least one of the one or more processors, further cause the system to:
determine a motional range associated with the user based on the motion-stabilization profile.

20. The system of claim 16, wherein the motion-stabilization profile associated with the user is generated utilizing a machine learning model trained on at least the monitored motional patterns of the user's hand.

* * * * *